(12) United States Patent
Kazama et al.

(10) Patent No.: US 9,056,355 B2
(45) Date of Patent: Jun. 16, 2015

(54) LATHE MACHINING MEMBER

(75) Inventors: Toshio Kazama, Nagano (JP); Noritoshi Takamura, Kanagawa (JP); Tomohiro Kawarabayashi, Nagano (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 37 days.

(21) Appl. No.: 12/737,555

(22) PCT Filed: Aug. 10, 2009

(86) PCT No.: PCT/JP2009/064141
§ 371 (c)(1),
(2), (4) Date: Jan. 25, 2011

(87) PCT Pub. No.: WO2010/016609
PCT Pub. Date: Feb. 11, 2010

(65) Prior Publication Data
US 2011/0123827 A1 May 26, 2011

(30) Foreign Application Priority Data
Aug. 8, 2008 (JP) .................................. 2008-206239

(51) Int. Cl.
*B32B 15/02* (2006.01)
*B23B 1/00* (2006.01)

(52) U.S. Cl.
CPC ........... *B23B 1/00* (2013.01); *Y10T 428/12875* (2015.01); *Y10T 428/12861* (2015.01); *Y10T 428/12236* (2015.01); *B23B 2222/12* (2013.01);
(Continued)

(58) Field of Classification Search
None
See application file for complete search history.

(56) References Cited

U.S. PATENT DOCUMENTS 2,196,303 A * 4/1940 Hensel et al. .................. 420/502
2,527,599 A * 10/1950 Terry ............................ 358/300
(Continued)

FOREIGN PATENT DOCUMENTS

| JP | 05-309538 A | 11/1993 |
| JP | 06-050391 A | 2/1994 |

(Continued)

OTHER PUBLICATIONS

Silver Data Sheet—posted online Nov. 19, 2002, 3 pages.*
(Continued)

*Primary Examiner* — Adam Krupicka
(74) *Attorney, Agent, or Firm* — Locke Lord LLP; James E. Armstrong, IV; George N. Chaclas

(57) ABSTRACT

A cylindrical core portion, at least a part of which is made of a noble metal alloy and which has a diameter larger than a maximum diameter of a shape obtained by lathe machining, and a hollow-cylindrical peripheral portion, which is made of a material different from the material of the core portion, are included. The core portion is arranged in a hollow portion of the peripheral portion with no space. The material applied to the peripheral portion is a free-cutting material selected from a group of, for example, free-cutting brass, free-cutting phosphor bronze, free cutting nickel silver, and free-cutting beryllium copper. The noble metal alloy applied to the core portion is, for example, alloy mainly consisting of silver, palladium, gold, platinum, zinc, copper, iron, and nickel, alloy mainly consisting of palladium, silver, and copper, or alloy mainly consisting of silver, platinum, zinc, gold, and copper.

16 Claims, 4 Drawing Sheets

(52) U.S. Cl.
CPC ......... *B23B 2222/21* (2013.01); *B23B 2222/24* (2013.01); *B23B 2222/68* (2013.01); *B23B 2222/72* (2013.01); *B23B 2222/76* (2013.01)

(56) References Cited

U.S. PATENT DOCUMENTS

| | | | | |
|---|---|---|---|---|
| 2,872,899 | A | * | 2/1959 | Trespalacios ................. 401/227 |
| 2,930,115 | A | * | 3/1960 | Dietzsch, Sr. et al. .......... 29/406 |
| 3,982,933 | A | * | 9/1976 | Rudolph et al. .............. 420/475 |
| 4,500,027 | A | * | 2/1985 | Nakajima ....................... 228/54 |
| 6,386,423 | B1 | * | 5/2002 | Adler et al. ..................... 228/54 |

FOREIGN PATENT DOCUMENTS

| | | |
|---|---|---|
| JP | 07-275924 A | 10/1995 |
| JP | 2000-343365 A | 12/2000 |
| JP | 2003-291002 A | 10/2003 |

OTHER PUBLICATIONS

Internet Archive Wayback Machine "http://www.mindat.org/min-2045.html" from Sep. 27, 2003.*

International Search Report dated Oct. 6, 2009, issued for PCT/JP2009/064141.

Office Action for Japanese Patent Application 2010-523916 mailed on Jul. 3, 2012.

* cited by examiner

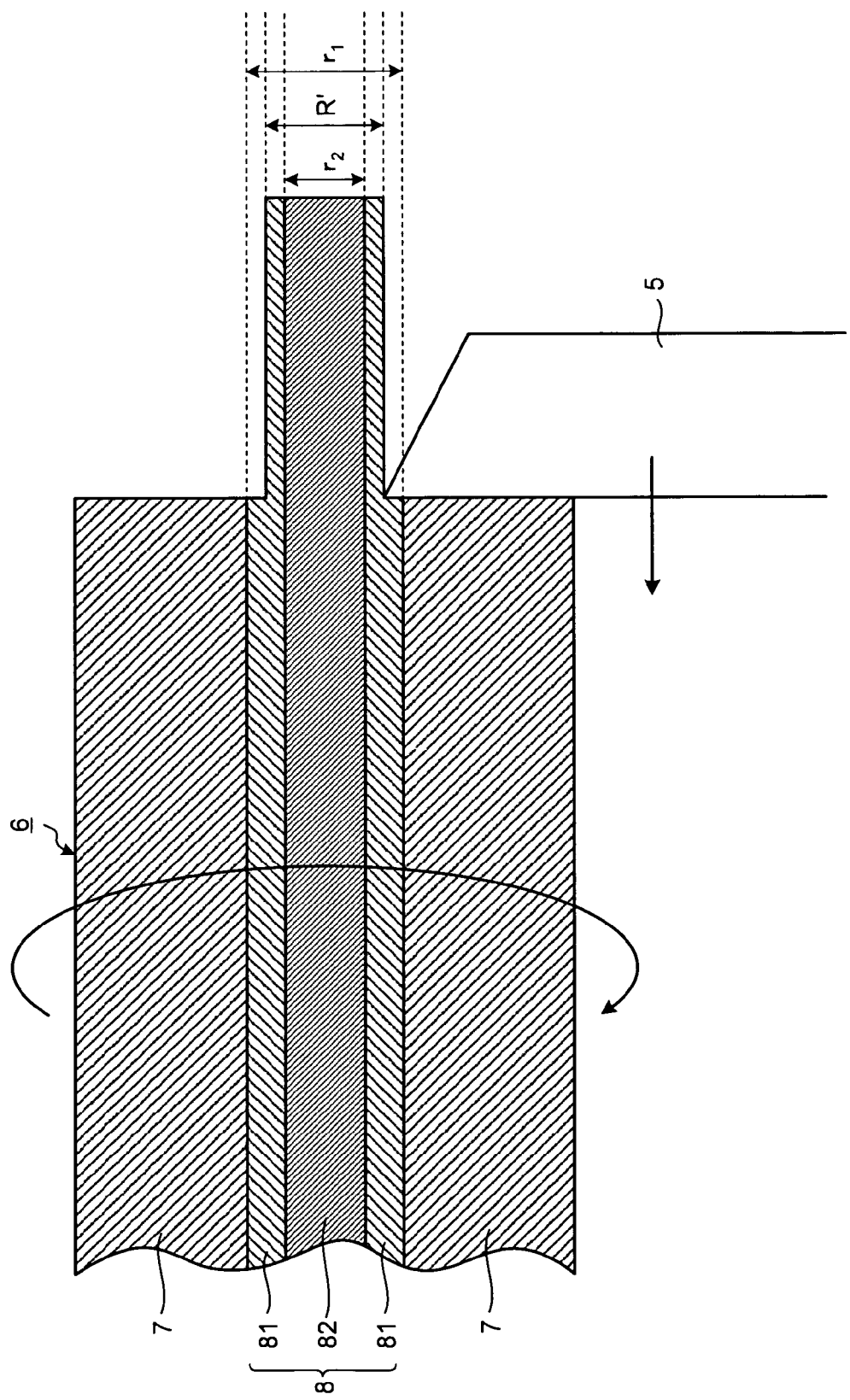

LATHE MACHINING MEMBER

FIELD

The present invention relates to a lathe machining member that is mounted on a lathe to be lathe machined.

BACKGROUND

Conventionally, when metal or the like is machined by using a lathe, a work as a lathe machining member is mounted on and fixed to a chuck of the lathe and the work is cut by using a cutting tool or a drill to form a desired shape. Specifically, when an axisymmetric member such as a screw is formed by lathe machining, a solid cylindrical work made of a solid material is generally applied as the work (see, for example, Patent Literature 1).

CITATION LIST

Patent Literature

Patent Literature 1: Japanese Laid-open Patent Publication No. 2003-291002

SUMMARY

Technical Problem

However, because a large part of the work is cut off by lathe machining, when a rare and expensive material such as a noble metal alloy is applied as a raw material, the material is wasted and it is difficult to reduce costs.

The present invention has been made in view of the above, and it is an object of the present invention to provide a lathe machining member that, when forming a product made of a rare and expensive material by lathe machining, is capable of reducing waste of such material and reducing costs.

Solution to Problem

To solve the problem described above and achieve the object, a lathe machining member according to the present invention that is mounted on a lathe to be lathe machined, includes: a cylindrical core portion, at least a part of which is made of a noble metal alloy and which has a diameter larger than a maximum diameter of a shape obtained by lathe machining; and a hollow-cylindrical peripheral portion made of a material different from the material of the core portion, wherein the core portion is arranged in a hollow portion of the peripheral portion with no space.

The lathe machining member according to the invention as set forth in the invention described above, the core portion includes a hollow-cylindrical outer core portion; and an inner core portion that is arranged in a hollow portion of the outer core portion with no space, wherein one of the outer core portion and the inner core portion is made of the noble metal alloy and the other one of the outer core portion and the inner core portion is made of a material different from the noble metal alloy.

The lathe machining member according to the invention as set forth in the invention described above, a diameter of the inner core portion is smaller than the maximum diameter.

The lathe machining member according to the invention as set forth in the invention described above, the peripheral portion is made of an alloy material.

The lathe machining member according to the invention as set forth in the invention described above, the alloy material is one material selected from the group consisting of copper-nickel silver, silver-copper alloy, brass, phosphor bronze, and beryllium copper.

The lathe machining member according to the invention as set forth in the invention described above, the alloy material is one material selected from the group consisting of free-cutting brass, free-cutting phosphor bronze, free cutting nickel silver, and free-cutting beryllium copper.

The lathe machining member according to the invention as set forth in the invention described above, the peripheral portion is made of iron.

Advantageous Effects of Invention

According to the present invention, a cylindrical core portion, at least a part of which is made of a noble metal alloy and which has a diameter larger than a maximum diameter of a shape obtained by lathe machining, and a hollow-cylindrical peripheral portion, which is made of a material different from the material of the core portion, are included. The core portion is arranged in a hollow portion of the peripheral portion with no space. Therefore, most of a portion to be cut off by using a lathe can be made of a material other than the noble metal alloy. Consequently, when a rare and expensive material such as noble metal alloy is used as a raw material for forming a machined product, it is possible to reduce waste of such material, enabling to reduce costs.

BRIEF DESCRIPTION OF DRAWINGS

FIG. 6 is a diagram illustrating an overview of lathe machining using the lathe machining member according to the second embodiment of the present invention.

DESCRIPTION OF EMBODIMENTS

Best modes for carrying out the present invention (hereinafter, "embodiments") are explained below with reference to the accompanying drawings.

First Embodiment

Figure 1:
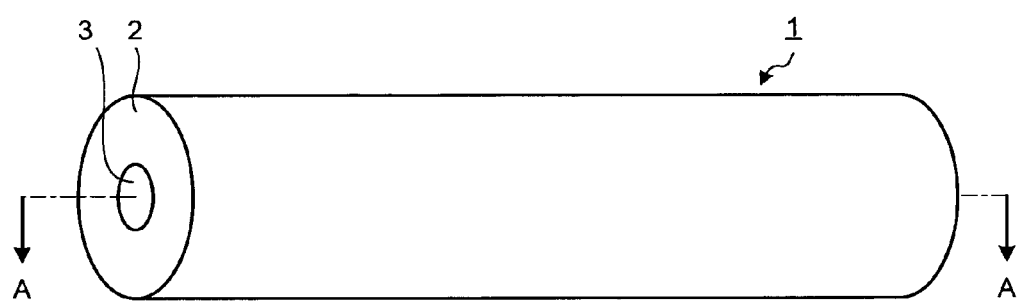
FIG. 1 is a diagram illustrating a configuration of a lathe machining member according to a first embodiment of the present invention.
Figure 2:
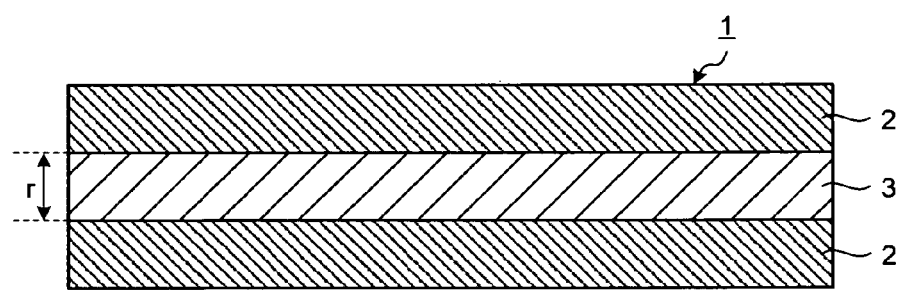
FIG. 2 is a cross-sectional view taken along line A-A in FIG. 1.

FIG. 1 is a diagram illustrating a configuration of a lathe machining member according to a first embodiment of the present invention. FIG. 2 is a cross-sectional view taken along line A-A in FIG. 1. A lathe machining member 1 includes a hollow-cylindrical peripheral portion 2 and a cylindrical core portion 3 that is made of a material different from a material of the peripheral portion 2 and that is arranged in a hollow portion of the peripheral portion 2 with no space.

The peripheral portion 2 is made of an alloy material. Any one material selected from a group of, for example, copper-nickel silver, silver-copper alloy, brass, phosphor bronze, and beryllium copper can be applied as the alloy material. Further, any one material (free-cutting material) selected from a group of, for example, free-cutting brass, free-cutting phosphor bronze, free cutting nickel silver, and free-cutting beryllium copper can be applied as the alloy material. A material other than the alloy material (for example, iron) may be applied to the peripheral portion 2.

The core portion 3 is made of a noble metal alloy. For example, an alloy mainly consisting of silver (Ag), palladium (Pd), gold (Au), platinum (Pt), zinc (Zn), copper (Cu), iron (Fe), and nickel (Ni), an alloy mainly consisting of palladium, silver, and copper, or an alloy mainly consisting of silver, platinum, zinc, gold, and copper may be applied as the noble metal alloy. The lathe machining member 1 is formed by a wire drawing process or a drawing process such that a predetermined ratio is maintained between the diameter of the peripheral portion 2 and the diameter of the core portion 3.

Figure 3:
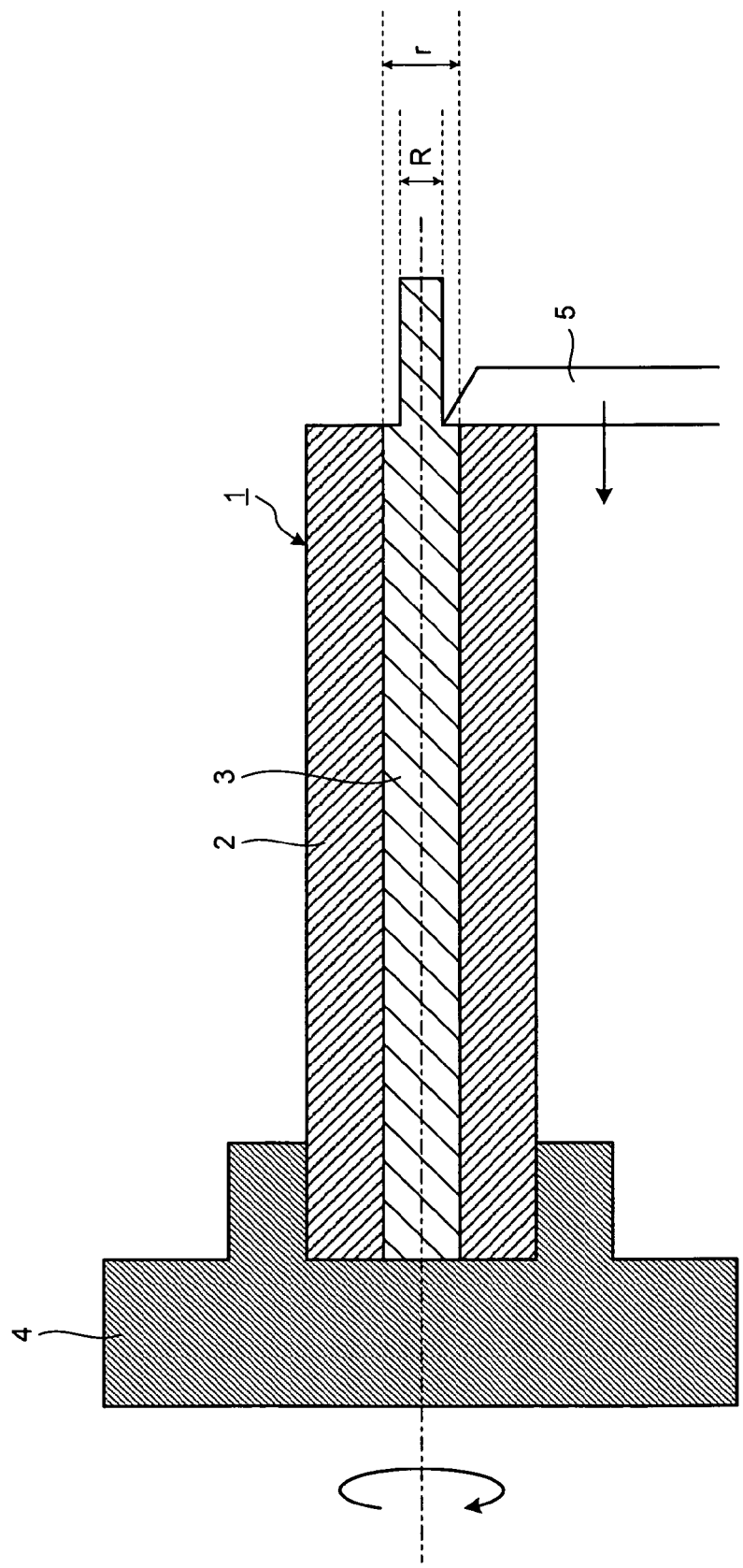
FIG. 3 is a diagram illustrating an overview of lathe machining using the lathe machining member according to the first embodiment of the present invention.

FIG. 3 is a diagram illustrating an overview of lathe machining using the lathe machining member 1. When lathe machining is to be performed, the lathe machining member 1 is mounted on and fixed to a chuck 4 of a lathe, starts and keeps rotating the chuck 4 at a predetermined rotation speed, and moves a cutting tool 5 from the right side to the left side in the figure to cut the lathe machining member 1 into a desired shape. The lathe machining member 1 may further be subjected to the wire drawing process or the drawing process before the lathe machining member 1 is cut using the lathe.

In FIG. 3, the maximum diameter R of the lathe machining member 1 after cutting by the cutting tool 5 is smaller than the diameter r of the core portion 3 (R<r). In this manner, according to the first embodiment, the diameter r of the core portion 3 is set to be larger than the maximum diameter R of the shape obtained by lathe machining, and the machined product consists of only a noble metal alloy.

Although a case is illustrated in FIG. 3 in which a cylindrical shape is obtained by the cutting, this is by way of example only. That is, in the first embodiment, the diameter r is determined such that the maximum diameter of the shape obtained by machining becomes smaller than the diameter r of the core portion 3 regardless of the machined shape.

According to the first embodiment of the present invention described above, the cylindrical core portion 3, at least a part of which is made of a noble metal alloy and which has the diameter larger than the maximum diameter of a shape obtained by lathe machining, and the hollow-cylindrical peripheral portion 2, which is made of a material different from the material of the core portion 3, are included. Further, the core portion 3 is arranged in the hollow portion of the peripheral portion 2 with no space. Therefore, most of a portion to be cut off by using the lathe can be made of a material other than the noble metal alloy. Consequently, when a rare and expensive material such as a noble metal alloy is used as a raw material for forming a machined product, it is possible to reduce waste of such material, enabling to reduce costs.

Second Embodiment

Figure 4:
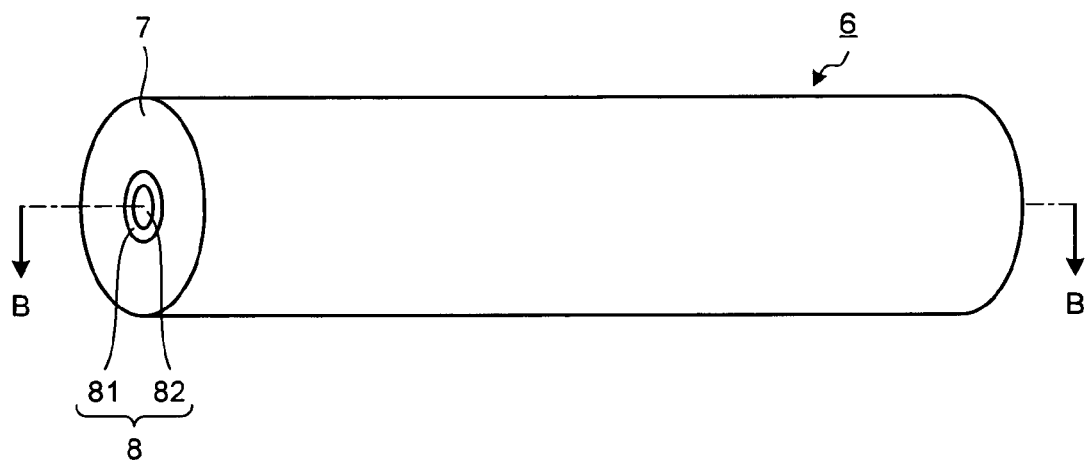
FIG. 4 is a diagram illustrating a configuration of a lathe machining member according to a second embodiment of the present invention.
Figure 5:
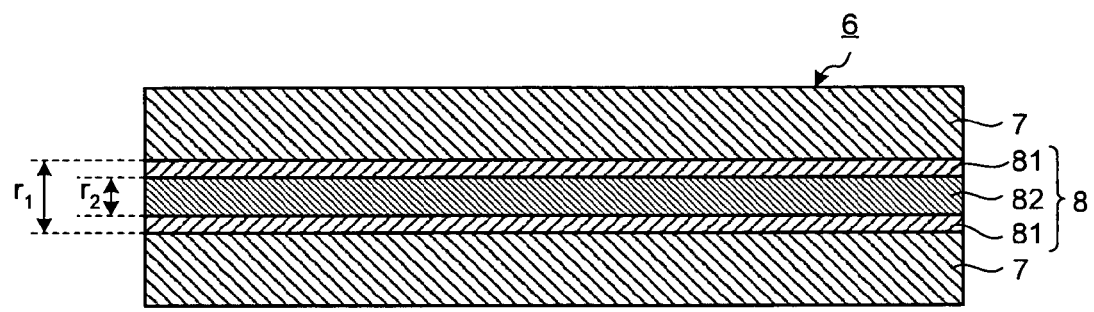
FIG. 5 is a cross-sectional view taken along line B-B in FIG. 4.

FIG. 4 is a diagram illustrating a configuration of a lathe machining member according to a second embodiment of the present invention. FIG. 5 is a cross-sectional view taken along line B-B in FIG. 4. A lathe machining member 6 illustrated in FIG. 4 and FIG. 5 includes a hollow-cylindrical peripheral portion 7 and a cylindrical core portion 8 that is arranged in a hollow portion of the peripheral portion 7 with no space. The peripheral portion 7 is made of the same material as that of the peripheral portion 2 of the first embodiment.

The core portion 8 includes a hollow-cylindrical outer core portion 81 and an inner core portion 82 that is arranged in a hollow portion of the outer core portion 81 with no space. One of the outer core portion 81 and the inner core portion 82 is made of a noble metal alloy similarly to the core portion 3 described above, and the other is made of metal, such as cooper or aluminum, other than the noble metal alloy. A combination of the materials of the outer core portion 81 and the inner core portion 82 may be determined depending on intended end-usage of a machined product.

FIG. 6 is a diagram illustrating an overview of lathe machining using the lathe machining member 6. Although it is not illustrated in FIG. 6, a left end portion of the lathe machining member 6 in the figure is fixed to the chuck 4 similarly to FIG. 3. Therefore, the lathe machining member 6 rotates along with the rotation of the chuck 4.

In FIG. 6, the diameter $r_1$ of the core portion 8, i.e., the diameter $r_1$ of the outer core portion 81, is set to be larger than the maximum diameter R' of a shape to be obtained by lathe machining ($r_1$>R'). The diameter $r_2$ of the inner core portion 82 is set to be smaller than the maximum diameter R' ($r_2$<R'). Accordingly, the machined product obtained by lathe machining has a two-layer structure formed of the outer core portion 81 and the inner core portion 82.

According to the second embodiment of the present invention described above, similarly to the first embodiment, when a rare and expensive material such as a noble metal alloy is used as a raw material for shaping a machined produce, it is possible to reduce waste of such material, enabling to reduce costs.

Furthermore, according to the second embodiment of the present invention, because the core portion 8 includes the outer core portion 81 and the inner core portion 82, which are made of mutually different metals (including a noble metal alloy), it is possible to combine optimal materials depending on use of the machined product.

In the second embodiment, a multi-layer structure formed of more than two layers made of mutually different metals may be applied to the core portion instead of the two layers formed of the outer core portion and the inner core portion.

The embodiment is described above as best modes for carrying out the present invention; however, the present invention should not be limited to the above embodiment. The present invention can include various embodiments and the like not described herein. Further, various design changes and the like may be made in the range without departing from the technical idea as specified by the claims.

INDUSTRIAL APPLICABILITY

As described above, the present invention is useful as a member to be mounted on a lathe to be lathe machined.

REFERENCE SIGNS LIST 1, 6 LATHE MACHINING MEMBER
2, 7 PERIPHERAL PORTION
3, 8 CORE PORTION
4 CHUCK
5 CUTTING TOOL
81 OUTER CORE PORTION
82 INNER CORE PORTION

The invention claimed is:
1. A lathe machining member that is mounted on a lathe to be lathe machined, the lathe machining member comprising:

a cylindrical core portion, at least a part of which is made of a noble metal alloy, is configured to have a diameter larger than a maximum diameter of a shape obtained by lathe machining, the noble metal alloy comprising:
silver (Ag), palladium (Pd), gold (Au), platinum (Pt), zinc (Zn), copper (Cu), iron (Fe) and nickel (Ni),
palladium (Pd), silver (Ag), and copper (Cu), or
silver (Ag), platinum (Pt), zinc (Zn), gold (Au) and copper (Cu); and
a hollow-cylindrical peripheral portion made of a material that is different from the material of the core portion, the peripheral portion being a portion to be cut off by lathe machining wherein
the core portion is arranged in a hollow portion of the peripheral portion with no space.

2. The lathe machining member according to claim 1, wherein
the core portion includes
a hollow-cylindrical outer core portion; and
an inner core portion that is arranged in a hollow portion of the outer core portion with no space, and wherein one of the outer core portion and the inner core portion is made of the noble metal alloy and the other one of the outer core portion and the inner core portion is made of a material different from the noble metal alloy.

3. The lathe machining member according to claim 2, wherein a diameter of the inner core portion is smaller than the maximum diameter.

4. The lathe machining member according to claim 1, wherein the peripheral portion is made of an alloy material.

5. The lathe machining member according to claim 4, wherein the alloy material is one material selected from the group consisting of copper-nickel silver, silver-copper alloy, brass, phosphor bronze, and beryllium copper.

6. The lathe machining member according to claim 4, wherein the alloy material is one material selected from the group consisting of free-cutting brass, free-cutting phosphor bronze, free cutting nickel silver, and free-cutting beryllium copper.

7. A lathe machining member that is mounted on a lathe to be lathe machined, the lathe machining member comprising:
a cylindrical core portion, which is made of a noble metal alloy and which has a diameter larger than a maximum diameter of a shape obtained by lathe machining, the noble metal alloy comprising Ag, Pd, and Cu; and
a hollow-cylindrical peripheral portion made of a material that is different from the material of the core portion and which is not the noble metal alloy, wherein
the core portion is arranged in a hollow portion of the peripheral portion with no space, and the core portion is configured to be lathe machined into the shape.

8. The lathe machining member according to claim 1, wherein the hollow-cylindrical peripheral portion is open at a terminal end thereof.

9. The lathe machining member according to claim 1, wherein the hollow-cylindrical peripheral portion is made of iron.

10. The lathe machining member according to claim 7, wherein
the core portion includes
a hollow-cylindrical outer core portion; and
an inner core portion that is arranged in a hollow portion of the outer core portion with no space, and wherein one of the outer core portion and the inner core portion is made of the noble metal alloy and the other one of the outer core portion and the inner core portion is made of a material different from the noble metal alloy.

11. The lathe machining member according to claim 10, wherein a diameter of the inner core portion is smaller than the maximum diameter.

12. The lathe machining member according to claim 7, wherein the peripheral portion is made of an alloy material.

13. The lathe machining member according to claim 12, wherein the alloy material is one material selected from the group consisting of copper-nickel silver, silver-copper alloy, brass, phosphor bronze, and beryllium copper.

14. The lathe machining member according to claim 12, wherein the alloy material is one material selected from the group consisting of free-cutting brass, free-cutting phosphor bronze, free cutting nickel silver, and free-cutting beryllium copper.

15. The lathe machining member according to claim 7, wherein the hollow-cylindrical peripheral portion is open at a terminal end thereof.

16. The lathe machining member according to claim 7, wherein the hollow-cylindrical peripheral portion is made of iron.

* * * * *